No. 744,859. PATENTED NOV. 24, 1903.
F. L. EBERHARDT.
MULTIPLE SPINDLE HORIZONTAL BORING OR DRILLING MACHINE.
APPLICATION FILED DEC. 15, 1902.
NO MODEL. 2 SHEETS—SHEET 1.
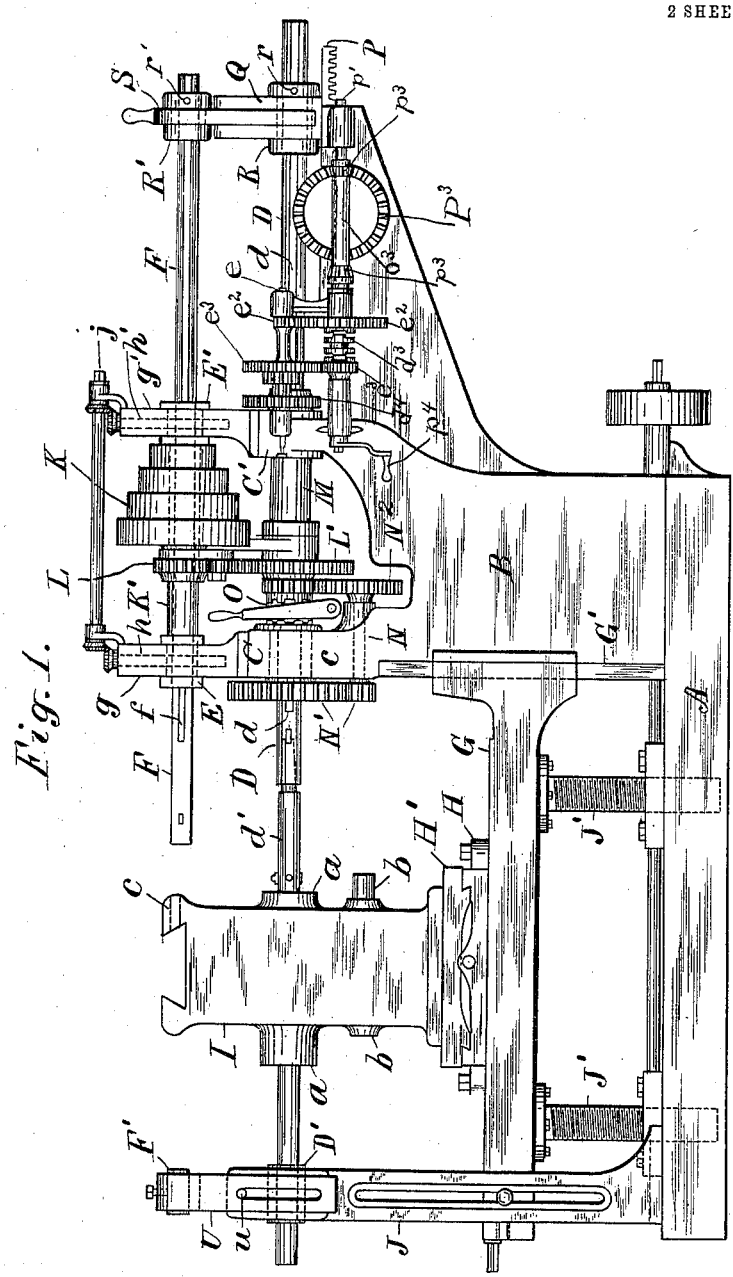
Attest:
L. Lee.
Arthur F. Heaton
Inventor.
Fred L. Eberhardt, per
Thomas S. Crane, Atty.

No. 744,859. PATENTED NOV. 24, 1903.
F. L. EBERHARDT.
MULTIPLE SPINDLE HORIZONTAL BORING OR DRILLING MACHINE.
APPLICATION FILED DEC. 15, 1902.
NO MODEL.
2 SHEETS—SHEET 2.
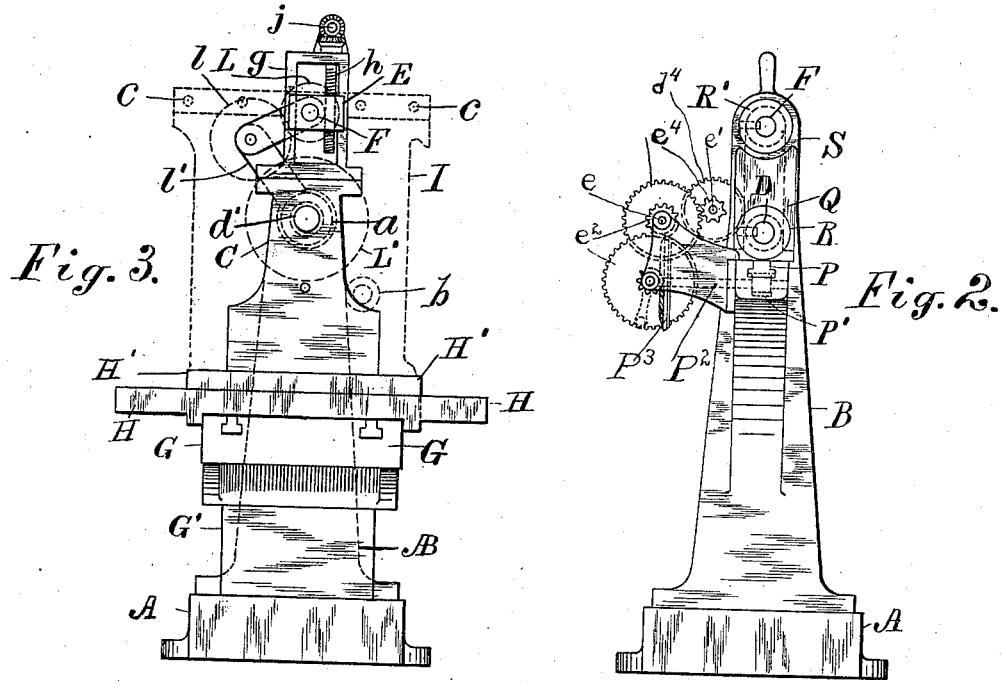
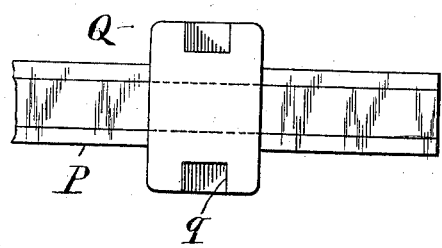
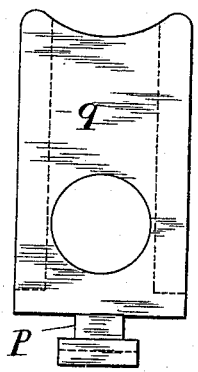
Attest:
L. Lee.
Arthur T. Heaton.
Inventor.
Fred L. Eberhardt,
per Thomas S. Crane, Atty.

No. 744,859. Patented November 24, 1903.

UNITED STATES PATENT OFFICE.

FRED L. EBERHARDT, OF NEWARK, NEW JERSEY, ASSIGNOR TO GOULD & EBERHARDT, OF NEWARK, NEW JERSEY, A CORPORATION OF NEW JERSEY.

MULTIPLE-SPINDLE HORIZONTAL BORING OR DRILLING MACHINE.

SPECIFICATION forming part of Letters Patent No. 744,859, dated November 24, 1903.

Application filed December 15, 1902. Serial No. 135,246. (No model.)

*To all whom it may concern:*

Be it known that I, FRED L. EBERHARDT, a citizen of the United States, residing at 17 Hillside avenue, Newark, county of Essex, State of New Jersey, have invented certain new and useful Improvements in Multiple-Spindle Horizontal Boring or Drilling Machines, fully described and represented in the following specification and the accompanying drawings, forming a part of the same.

The present invention relates to boring-mills of that class which have a table adjustable at different heights to support the work-piece and a horizontal spindle adapted to travel longitudinally over the table, so as to mill or bore cavities therein. In such boring-mills an outboard-bearing is commonly provided at the opposite side of the table from the spindle-bearings, so that the spindle may be supported at its outer end when boring cylinders or doing heavy work. A feed mechanism operated in unison with the rotations of the spindle is in such mills always provided to feed the spindle longitudinally when in operation with means to detach the automatic feed, so as to move the spindle longitudinally by hand. In such boring-mills it is common to provide the table with a carriage movable transversely, so as to adjust the work-piece in relation to the spindle; but the vertical space within which the spindle can operate upon such work-piece is limited to the vertical adjustment of the table.

To adapt a boring-mill of ordinary proportions to operate upon a work-piece through a much greater vertical range than heretofore, I mount a supplemental work-spindle above the ordinary work-spindle and provide means for coupling or connecting the feed mechanism with either of such spindles. The space between such upper spindle and the table when in its lowest position is thus greatly augmented and holes may be drilled or bored at a single setting in a piece of much greater height than is possible with the ordinary single spindle. The upper spindle being farther from the base of the machine is not supported with the same rigidity as the lower spindle, and the driving-gear for the two spindles may therefore be arranged to drive the lower spindle with more power than the upper. This is readily effected by mounting a belt-cone to turn upon the upper spindle and connecting it to the lower spindle by reducing-gear, so as to drive the same with less speed and more strength, and in such construction means is provided to couple the cone and the reducing-gear at pleasure to their respective spindles. The belt-cone or other driving agent may when desired be mounted upon the frame separately from the upper spindle and connected with it by "reducing-gear," or the upper spindle may be provided with back gearing in case the belt-cone is mounted upon it. The upper spindle may be mounted in bearings adjustable vertically, so as to vary its distance from the lower spindle and set it more readily into operative relation to a work-piece upon the table. In such case the two spindles would be connected by gearing having an automatically-adjustable intermediate, which would preserve the connection of the two spindles in all positions of the upper one. An adjustable outboard-bearing for the upper spindle may also be attached to the ordinary outboard-bearing for the lower spindle. In practice a feed-slide is commonly mounted parallel with the spindle and coupled adjustably thereto, so as to feed the same when required, and the present invention includes means for connecting the upper or auxiliary spindle detachably and adjustably to the same feed-slide, so that means for feeding the additional spindle is secured without any material increase in the cost of the machine. Where the upper spindle is made adjustable vertically, an adjustable connection with the feed-slide is provided.

The invention will be understood by reference to the annexed drawings, in which—

Figure 1 is a side elevation of the machine. Fig. 2 is an elevation of the same, showing the feed connections to the spindle. Fig. 3 is a cross-section of the work-table with a shaping-machine frame thereon, showing the operation of the invention upon such a work-piece. Fig. 4 is a plan of the outer end of the feed-slide with the feed-bearing for connection to the two spindles. Fig. 5 is a side view, and Fig. 6 an end view, of the adjustable feed-coupling for the auxiliary spindle.

Fig. 7 is an edge view, and Fig. 8 a side view, of the fork for coupling the same to the feed-bearing. Fig. 9 is an end view of the feed-bearing Q.

A designates the bed-plate of the boring-mill; B, the frame or column, carrying a pair of bearings C and C' for the main boring-spindle D. Bearings E and E' are sustained above the bearings C and C' to carry the auxiliary spindle F. Housings $g$ $g'$ are attached to the bearings C and C', and the bearings E and E' are adjustable vertically in the housings by means of screws $h$ $h'$ and connecting gearing with a shaft $j$, which may be turned by a hand-crank.

G designates the work-table, having plate H adjustable longitudinally thereon and a carriage H' adjustable transversely upon the plate to support the work-piece, (represented by the shaping-machine frame I.)

An outboard-bearing standard J is shown at the outer end of the table with boxes D' and F', adapted to receive boring-bars carried by the spindles D and F, respectively.

The box D' for the lower spindle is mounted in the usual manner in a fixed position upon the bearing or standard J to correspond with the fixed bearings of the lower spindle; but the box F' is adjustable vertically upon the standard J for alinement with the vertically-adjustable spindle F in the various positions to which said spindle may be moved. The vertical adjustment of the box F' is shown in the drawings effected by a slotted leg U, extended from the box F' along the side of the standard J and having a bolt $u$ inserted through the slot into the standard, which secures the box F' adjustably.

The spindles D and F are seldom extended to the outboard-bearing; but such bearing is used to support the arbors or mandrels driven by the spindles.

The table G is fitted to vertical ways G' upon the frame B in the usual manner, and the vertical adjustability of the table is necessarily limited by the length of such ways and the space between the main work-spindle and the bed-plate A.

A belt-cone K is shown attached to a sleeve K', splined by keyway $f$ to the auxiliary work-spindle F, and a cog-wheel L is attached to such cone or sleeve. A cog-wheel L' is attached to a sleeve M, fitted to turn loosely in the usual manner upon the main work-spindle D, the proportions of the wheels L and L' serving when the cone K revolves to drive the sleeve M slower than the sleeve K'.

The wheels L and L' are connected by an intermediate wheel $l$, carried by jointed links $l'$, the three wheels and links forming an expansible gearing to connect the two spindles in all positions of the spindle F. The lower spindle D is shown provided with the usual back gearing, comprising the back-gear shaft N, connected at one end by reducing-gear N' to a collar $c$, turned upon the spindle D in the bearing C. The back-gear spindle is connected at the other end by gears $N^2$ with the sleeve M. A clutch-hub $o$ is splined by keyway $d$ to the spindle D between the adjacent ends of the collar $c$ and the gear $N^2$. The clutch-hub O and spindle D may thus be engaged with the larger gear N' or with the sleeve M at pleasure to vary the speed, as is usual with back gears. The speed of the spindle D is also varied by the application of the belt to the speeds of the cone K.

The upper spindle F is shown provided only with the belt-cone to vary its speed, which is sufficient to operate such spindle for a considerable range of small boring and drilling; but where it is desired to use the upper spindle for heavier work it would be furnished with back gearing in any suitable manner to drive it more slowly and with greater strength.

When using the lower spindle alone, the upper spindle turns idly with the belt-cone K. The feeding appliances embrace the usual feed-slide P, mounted to move longitudinally adjacent to the spindle D and provided with teeth to fit the feed-pinion P'. The feed-gearing is shown of the usual character in Figs. 1 and 2 and serves to connect the spindle D with the shaft $P^2$ of the pinion P', so as to reverse the motion or vary the speed of the pinion as the feed may require. A bevel-wheel $P^3$ is shown upon the outer end of the shaft $P^2$ and may be driven reversibly by pinions $p^3$, carried by a sleeve $o^3$, which is splined upon a feed-shaft $p'$. This feed-shaft is connected by back gears $e^2$ and $e^3$ with a back-gear shaft $e$, the back gears being connected at pleasure with the feed-shaft $p'$ by a clutch-hub $d^3$, which in practice is splined upon the shaft and moved by a lever when required. The end of the shaft $p'$ is shown provided with a crank $p^4$ to operate the feed by hand when desired, the clutch $d^3$ being placed in its middle or neutral position (shown in Fig. 1) at such time. The back-gear shaft is connected by change-wheels $e^4$ with a shaft $e'$, which in turn is connected by gears $d^4$ with the spindle D by a splined connection, so that the spindle may move longitudinally through the same. The gearing for connecting the spindle D with the pinion P' is not claimed herein, as it is used in single-spindle boring-mills.

A bearing Q, attached to the slide, embraces a circularly-grooved coupling-block R, which is splined to the keyway $d$ on the spindle D and is provided with means, as set-screw $r$, for securing the block adjustably to the spindle. A similar grooved coupling-block R' is splined to the keyway $f$ of the upper spindle F and may be secured to the spindle by set-screw $r'$. The opposite sides of the bearing Q are grooved vertically in correspondence with the circular groove in the coupling-block R', and a fork S, having two parallel tongues adapted to fit such grooves, is slipped over the coupling-block into the grooves $q$ upon the bearing when it is desired to couple the upper spindle to the feed-slide. When the coupling-block R' is coupled to the spindle F by the screw r', it turns within the arch s of the fork S, while the opposite flat faces of the fork contact with the sides of the groove in the coupling-block and are thus enabled to feed the spindle F in either direction. The prongs or legs of the fork are made of suitable length to slide up and down in the grooves q when the upper spindle is adjusted at different heights, thus maintaining the connection of the feed-slide with the upper spindle in all positions of the latter. The fork can be instantly applied to the coupling-block and bearing Q, and the connection between the feed mechanism and the upper spindle can thus be instantly made with this single piece.

The adjustable table and carriage, the lower spindle, its outboard-bearing, the back gearing, and feeding devices for the lower spindle are common in boring-mills, and my invention therefore includes in addition to the upper spindle a connection of the same with the ordinary feed mechanism, which serves to vertically increase the capacity of the machine with a very slight increase in the number of the parts or cost. My invention also covers the vertical adjustability of the upper spindle by means of the movable boxes E E' and gearing for maintaining the connection of such adjustable upper spindle with the feed mechanism and with the lower spindle. It also includes, if required, an adjustable outboard-bearing to steady a boring-bar held by the upper spindle.

Fig. 3 shows the application of the upper work-spindle to drilling or boring at a height entirely above the range of the main work-spindle D. The frame I is shown with a main bearing a, set to be bored by the main spindle D, and with a shaft-bearing b at a lower level, which the main spindle may also be used to bore by suitably elevating the table. At the upper edge of the work-piece I is shown a row of screw-holes c, which are above the reach of the work-spindle D when the table is let down to the lowest point, but may be readily bored by a drill in the auxiliary spindle F by partly lowering the table G, as shown in Fig. 1, and moving the work-piece horizontally in the usual manner by the carriage H'. The work-piece shown illustrates the application of the auxiliary spindle for finishing the drilling and boring upon the work-piece at a single setting of the latter, although the height of the work-piece exceeds the maximum distance between the table and the lower spindle D.

It will be understood that the upper spindle may be used to perform boring operations, as well as drilling, upon parts too high to be operated upon by the lower spindle. For instance, the two spindles may be operated simultaneously to bore twin engine-cylinders, the centers of the boring-bars being adjusted (by suitably setting the boxes E and E') to correspond with the desired centers. Where the upper spindle is employed for boring work like an engine-cylinder upon the upper part of a high casting, it is obvious that the housings and bearings for the upper spindle may be made of suitable strength and provided with suitable back gearing to operate as effectively as the lower spindle.

It is obviously immaterial whether two or more spindles are used in practicing my invention, as the invention is fully embodied in connection with two spindles.

From the above description it is evident that my invention enormously increases the capacity and utility of a boring-mill with very slight addition to its cost.

Having thus set forth the nature of the invention, what is claimed herein is—

1. A horizontal boring-mill having two work-spindles mounted to rotate and move longitudinally in horizontal bearings at different heights, a speed-cone splined upon the upper spindle and geared to the lower spindle, and feed mechanism driven by the lower spindle, with connections adapted to independently engage either one of the said spindles to move it longitudinally.

2. A horizontal boring-mill having two work-spindles mounted in bearings at different heights, a slide parallel with the said spindles, feed mechanism for propelling the slide, and means for engaging the slide with either or both of said spindles.

3. A horizontal boring-mill having two work-spindles mounted in bearings at different heights above the work-table, a driver splined upon the upper spindle, the back-gear shaft N with trains of gearing N', N$^2$ extended to the lower spindle, the collar c mounted in the bearing C, and connected with the gearing N', the sleeve M upon the spindle D connected with the gearing N$^2$, the clutch-hub O splined to the lower spindle and adapted at pleasure to engage either the gearing N' or the gearing N$^2$, and gearing connecting the driver upon the upper spindle with the sleeve M and the gearing N$^2$, whereby the motion of the driver may be imparted directly to the lower spindle, or indirectly through the back gearing.

4. A horizontal boring-mill having a vertically-adjustable table with bearings carrying two work-spindles at different heights above such table, gearing for driving the spindles independently, a feed-slide movable parallel with the spindles, gearing connected with one of the spindles to operate said feed-slide, and means for connecting said feed-slide with either of the work-spindles at pleasure.

5. A horizontal boring-mill having a vertically-adjustable table with carriage adjustable transversely thereon, a frame at one end of the table with bearings in pairs supporting two work-spindles at different heights one above the other and movable over the table, a feed-slide movable longitudinally below the lower spindle, gearing for driving the spindles independently, mechanism connected with one of the spindles for feeding the said slide in reverse directions and means for coupling the feed-slide to either of the said spindles to propel the same.

6. In a horizontal boring-mill, the combination, with two parallel spindles having each a circularly-grooved coupling-block secured adjustably thereon, of a feed-slide parallel with the lower spindle, a bearing thereon swiveled to the lower coupling-block and having grooves in its opposite edges and a form fitted to the groove of the upper coupling-block and to the sides of the said bearing to couple the upper spindle rotatably to the feed-slide.

7. In a boring-mill having a horizontal table and two horizontal spindles mounted in bearings at different heights to move over the table, the combination, with said spindles, of a feed-slide mounted below the lower spindle, a circularly-grooved coupling-block secured adjustably upon each of the spindles, a bearing upon the feed-slide swiveled to one of said coupling-blocks and said bearings having grooves at the sides, and a fork fitted to the groove in the other coupling-block and to the grooves in the bearing to lock the upper spindle rotatably to the said bearing.

8. In a horizontal boring-mill, the combination, with the lower spindle mounted in fixed bearings, an auxiliary spindle vertically adjustable above the same, and a circularly-grooved coupling-block secured adjustably upon each of said spindles, of a feed-slide parallel with the lower spindle, a bearing on said feed-slide swiveled to the lower coupling-block and having vertical grooves in its opposite edges, and a fork fitted to the groove of the upper coupling-block and fitted adjustably to the grooves in the sides of the said bearing to couple the upper spindle rotatably to the feed-slide in various positions of the said spindle.

9. The horizontal boring-mill having the main spindle D mounted in the fixed bearings C, C', and the spindle F mounted in adjustable bearings as set forth, the spindles D and F being constructed to receive boring-bars as set forth, the work-table G vertically adjustable below the level of the said spindles, the outboard-bearing standard J having the fixed box D' to receive a boring-bar in the spindle D, and the box F' adjustable upon the standard J to receive a boring-bar in the spindle F, the outboard for the adjustable spindle being thus supported adjustably by the outboard-bearing for the main spindle.

In testimony whereof I have hereunto set my hand in the presence of two subscribing witnesses.

FRED L. EBERHARDT.

Witnesses:
A. M. BYRNE,
THOMAS S. CRANE.